United States Patent Office.

JAMES J. ROCHE, OF BOSTON, ASSIGNOR OF ONE-HALF TO WILLIAM P. GREENOUGH, OF CAMBRIDGE, MASSACHUSETTS.

PROCESS OF TREATING GRAIN FOR SHIPMENT.

SPECIFICATION forming part of Letters Patent No. 263,590, dated August 29, 1882.

Application filed July 17, 1882. (No specimens.)

*To all whom it may concern:*

Be it known that I, JAMES J. ROCHE, of Boston, in the county of Suffolk and State of Massachusetts, have invented certain new and useful Processes of Treating Grain, of which the following is a specification.

The object of my invention is to prepare grain by chemical and mechanical processes, which processes shall prevent decay and leave the grain in compressed packages which will bear handling, transportation, and other commercial usuages. I attain these objects by a treatment consisting of a series of processes set forth and described in the following: First, the grains, being properly selected, are ground, crushed, or broken to the desired degree of fineness, then subjected to the action of an anhydride sulphurous acid, and then to a steam bath, the steam bath being so regulated, both as to temperature and duration, that the contained soluble starchy matter shall be so converted that it—the soluble starch moistened by condensed steam—may act as a cement for uniting the mass when the same is subjected to pressure, but not to cook it. Finally, the mass is divided into convenient quantities and compressed, while still hot from the steam treatment, into cakes, which will bear handling, transportation, and other treatment to which commercial articles are subjected.

I claim—

The process consisting of the following steps: first, reducing the grain to the desired fineness; second, subjecting it to the action of sulphurous anhydride; third, subjecting it to a steam-bath; and, finally, compressing it, while still hot and moist, into solid cakes, all substantially as described, and for the purpose set forth.

JAMES J. ROCHE.

Witnesses:
 WILLIAM EDSON,
 HELEN M. FEEGAN.